June 19, 1962
F. C. McMANUS
3,039,822
STABILIZING MOUNTING MEANS FOR SEMI-TRAILER TILTING BODIES
Filed Jan. 22, 1958
4 Sheets-Sheet 1
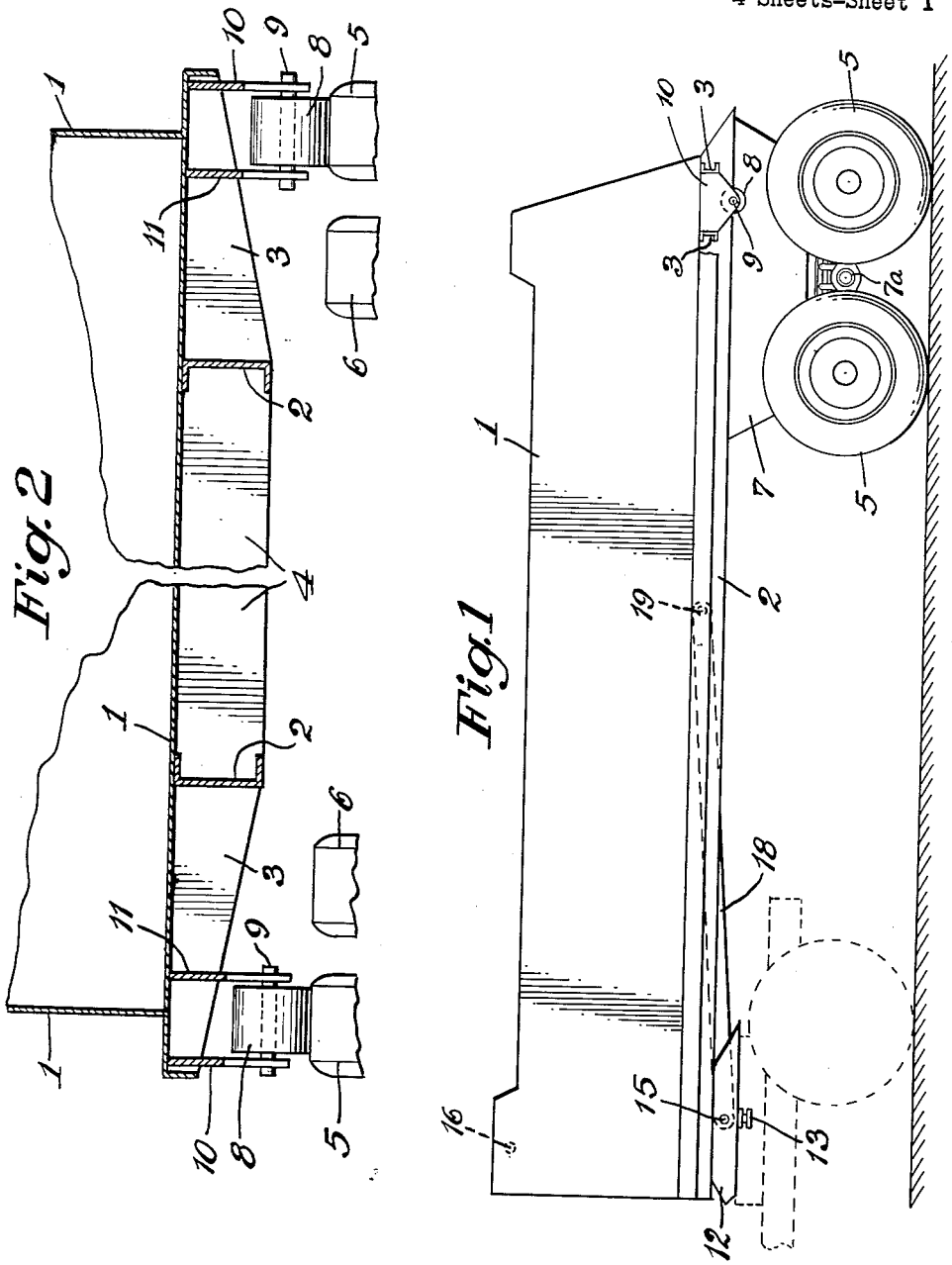
Inventor
Frank C. McManus
by Parker & Carter
Attorneys

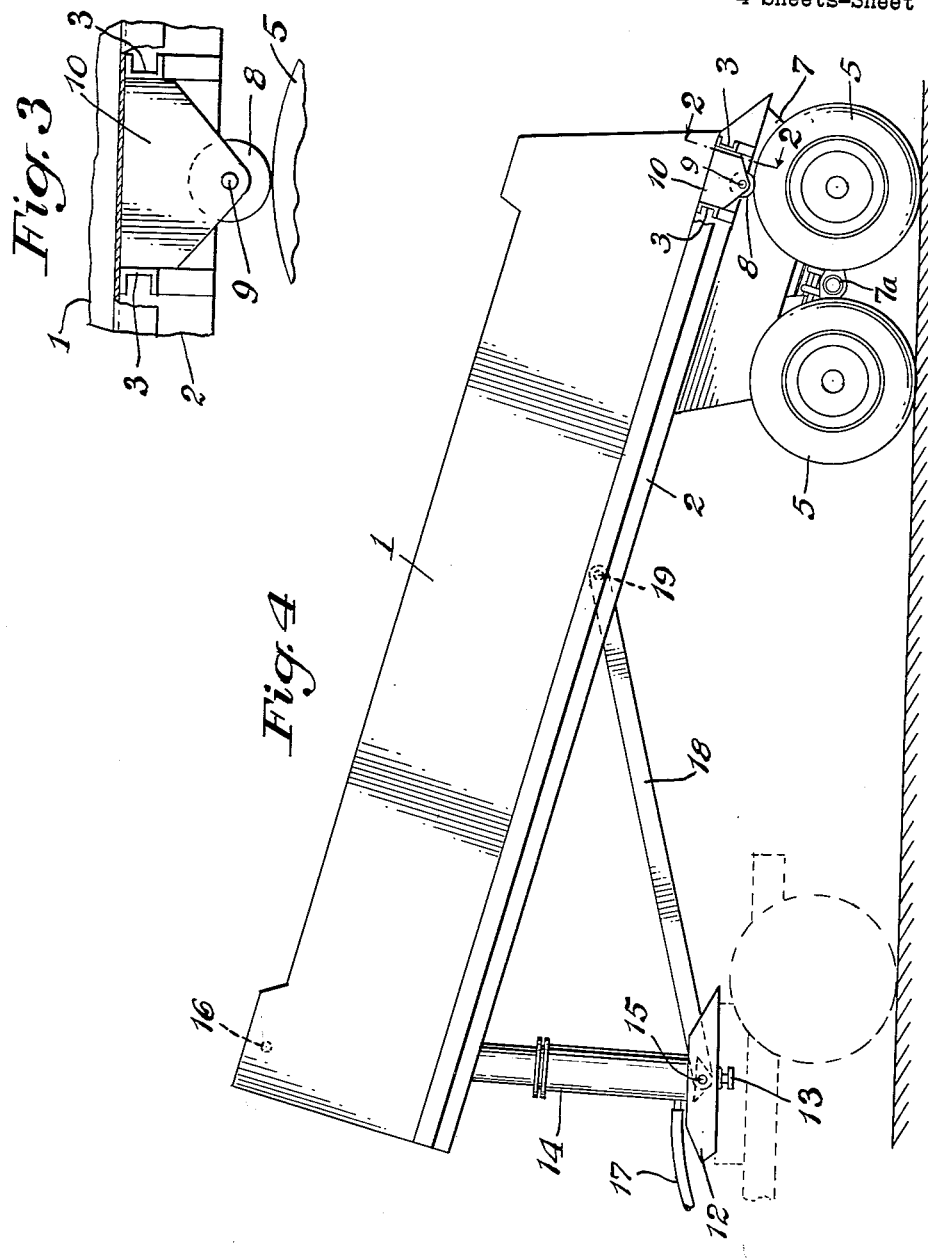

June 19, 1962     F. C. McMANUS     3,039,822
STABILIZING MOUNTING MEANS FOR SEMI-TRAILER TILTING BODIES
Filed Jan. 22, 1958     4 Sheets-Sheet 4
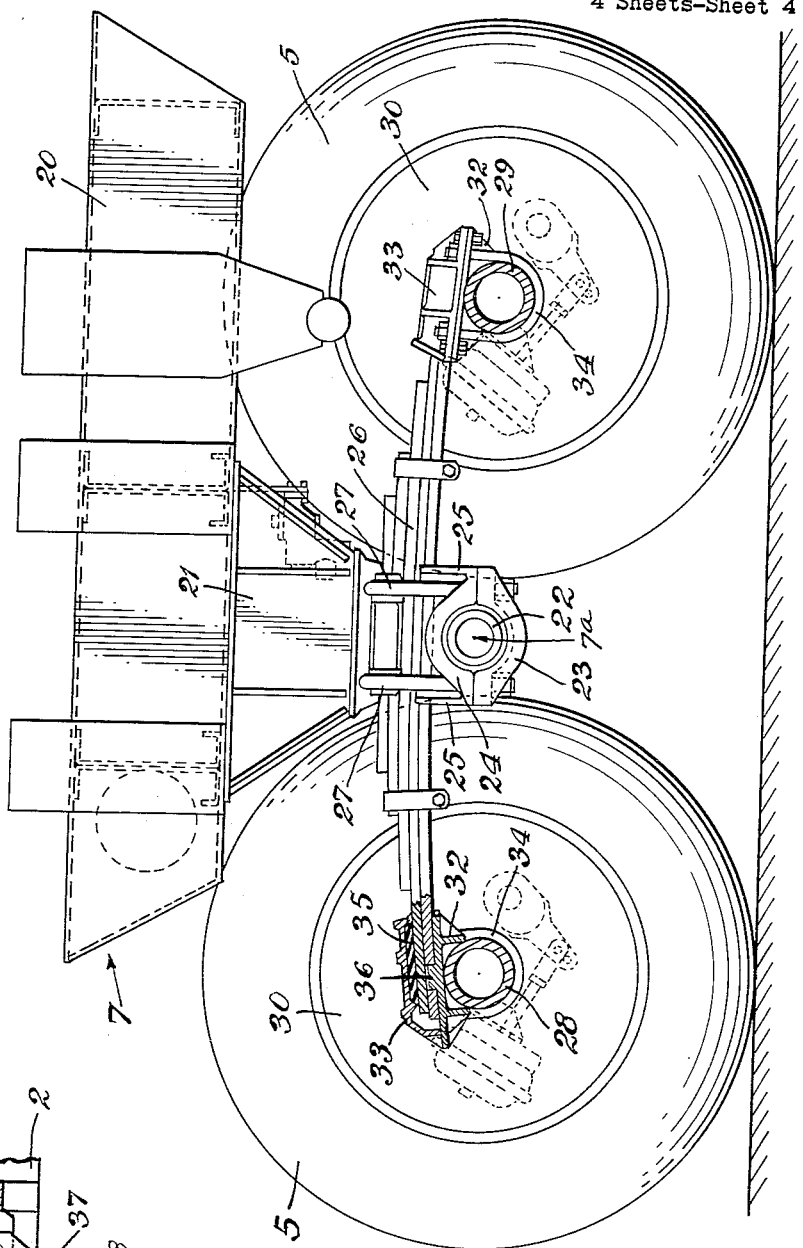
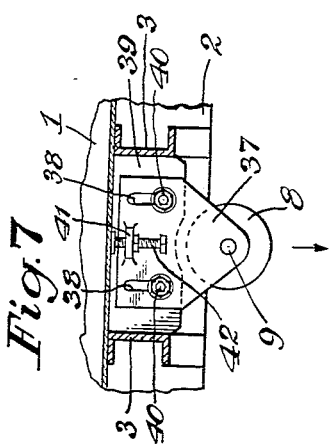
Inventor
Frank C. McManus
by Parker & Carter
Attorneys

United States Patent Office 3,039,822
Patented June 19, 1962

3,039,822
STABILIZING MOUNTING MEANS FOR SEMI-TRAILER TILTING BODIES
Frank C. McManus, Streator, Ill., assignor to Anthony Company, Streator, Ill., a corporation of Illinois
Filed Jan. 22, 1958, Ser. No. 710,451
3 Claims. (Cl. 298—17)

This invention relates to a tipping truck-trailer or other vehicle, and particularly to means for stabilizing the body of such a device during tipping. It has for one object, therefore, to provide a stabilizing means or arrangement whereby a load-carrying member, which is adapted to be tipped, is stabilized during tipping.

Another object is to provide in such a device means for extending the effective width of the support of a load-carrying member upon the vehicle by which it is carried.

Another object is to provide, in connection with a load-carrying means or member, an arrangement whereby upon the occurrence of tipping the base upon which the load-carrying member is wholly or partially supported is substantially extended.

Another object is to provide, in connection with a tipping, load-carrying member, means which becomes effective during tipping to add a stabilizing effect automatically during tipping alone.

Other objects will appear from time to time throughout the specification and claims.

The invention is illustrated more or less diagrammatically in the accompanying drawings wherein:

FIG. 1 is a side elevation with parts broken away illustrating one form of the device as applied to a trailer;

FIG. 2 is a partial vertical section taken on an enlarged scale at line 2—2 of FIG. 4;

FIG. 3 is an enlarged side elevation with parts omitted and parts broken away showing the tire or wheel-contacting means;

FIG. 4 is a side elevation of the trailer of FIG. 1 shown in a partially tipped position;

FIG. 6 is a side elevation with parts omitted and parts in section showing one form of double axle construction; and FIG. 7 is a vertical section showing an adjusting means for the adjustment of the rollers.

Like parts are designated by like characters throughout the specification and drawings.

Figure 5:
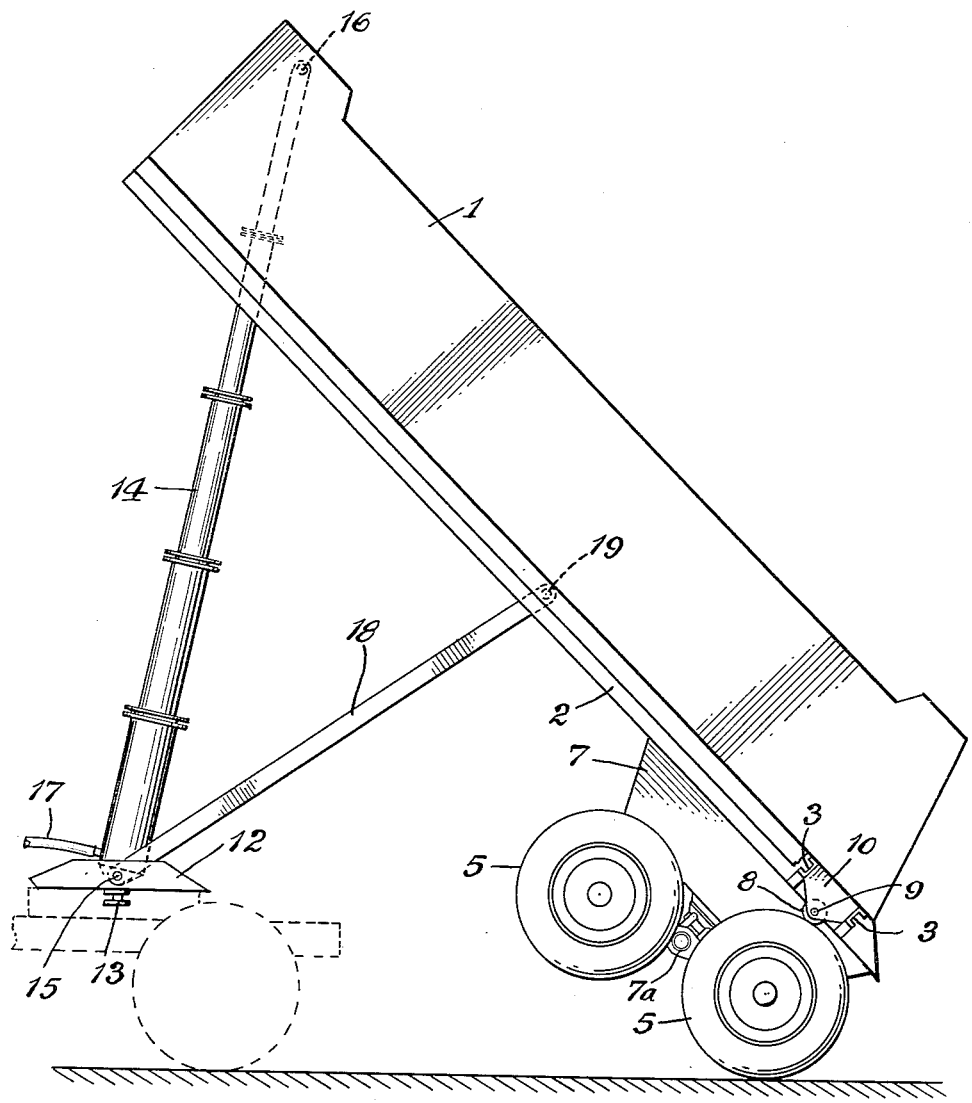
FIG. 5 is a side elevation of the device of FIGS. 1 and 4 in an extended tipped position.

In the particular form shown the invention is applied to a tipping trailer in which means are also provided to tip the trailer about its ground-contacting supports. In this form, when tipping or dumping is accomplished a portion of the ground-contacting members serves as the support about which tipping takes place and serves also as the means for increasing the stabilization desired.

As shown in FIG. 1, 1 is a load-carrying body with an open top. It is arranged to receive a load and to retain it until tipped. It may or may not be provided with a tail gate. The body is provided with a frame which includes side members 2, 2. These members extend generally from end to end of the body and one or more transverse frame members 3 are provided. Generally there will be several such transverse members and they may extend from side to side of the body 1 or may, as shown in FIG. 2 in particular, extend laterally beyond the side wall of the body. As shown, the members 3 may be tapered and a portion 4 extends between the frame members 2. For each of the side members 3 there may be a portion 4 so that, in effect or actual, a continuous transverse frame member extends from side to side of the body or the members 3 and 4 may be present in different proportions or different numbers. Generally it is sufficient that there be enough transverse and longitudinal frame members for the body to support it and to furnish an adequate structure for the trailer as a whole.

At least two of the transverse members 3 extend over the road-contacting members. In this case the road-contacting members comprise outer pairs of wheels 5, 5 and inner pairs of wheels 6. The wheels are generally as shown, typical of present day development, and there are thus shown eight wheels, four on a side generally toward the rear of the body 1. Axles, springs and other supporting means are present, but form no essential part of the present invention. It is sufficient that supporting means for the wheels or other ground-contacting members be provided by means of which the body is supported from the members 5 and 6. The springs and other such members are indicated generally and diagrammatically at 7, with a trunnion indicated at 7a.

To the outer end of each of the rear pair of transverse members 3 is connected a roller 8. The roller may be supported on a shaft 9 which is itself carried by plate or frame members 10, 11 which are secured to and supported from the body 1, the transverse members 3, or other available frame members.

At or near the forward end of the body 1 is positioned a fifth wheel member 12 which has fixed to it a connecting member 13. The fifth wheel mechanism and the connecting member may suitably be conventional and follow the general design of such mechanisms presently available. They may, of course, be varied. Only so much of these members is shown as to indicate that in the form of the device illustrated in FIGS. 1 to 5, inclusive, there is provision for connecting the trailer-dumping assembly as a unit to a tractor vehicle. The tractor vehicle may be of any design so long as it is equipped with for being detachably connected to the trailer dump vehicle.

Secured to the fifth wheel member 12 is a telescopic piston and cylinder assembly 14. This is preferably pivoted to the member 12 as at 15 in suitable bearings or other supports permitting relative swinging movement of the telescopic piston and cylinder assembly with respect to the fifth wheel. At its upper end the assembly 14 is pivoted as at 16 to the body 1. Means, not shown, are provided preferably on the tractor for supplying pressure fluid to the piston and cylinder assembly. A connection 17, which may comprise a flexible conduit, is connected to the piston and cylinder assembly and to a pump or other source of pressure fluid. One or more draft members 18 are movably connected to the fifth wheel or foot member 12. Preferably the connection of the draft member or members 18 is pivotal or concentric with the pivot point 15 of the piston and cylinder assembly 14. The draft member is also movably and preferably pivotally connected to the tipping body frame. Connection is arranged by any suitable bearings, not shown in detail, and, as indicated in FIG. 5 in particular, the pivotal movement of the member or members 18 with respect to the body 1 at the point of connection is about the center 19.

In FIG. 6 there is shown one suitable form of double axle or bogie construction. The invention is not limited to this particular type of construction but it is one which is suitable for use in connection with the invention. FIG. 6, therefore, illustrates more in detail the springs, axles and other mounting means which are shown diagrammatically in the other figures by the members 7 and 7a. As shown in FIG. 6, there is a frame 20 which is secured to the vehicle frame. The particular details of the frame 20 need not be described in connection with this figure, as the frame 2 is shown in other figures. It may, and preferably does, extend from side to side of the frame assembly 2. Extending downwardly from the frame 20 adjacent each side of that frame are members 21 which furnish bearings and supports for a trunnion member 22. This member extends from side to side of the wheel assembly. Upon this member, at or near each end, is a spring support assembly which includes a member 23 embracing the trunnion member or shaft 22 and a second cooperating member 24 also embracing the shaft 22. The upper member 24 is shaped, as at 25, 25, to receive a spring 26. The spring 26 is held in place by U-bolts 27, 27 which engage the parts 23 and 24. By this construction the springs are mounted upon trunnions so that tilting may take place.

The frame 20 occupies generally the position, with relation to the vehicle frame 2, as that shown diagrammatically in FIG. 1 by the member 7.

At each end of each spring assembly are axles 28 and 29, 28 being the forward axle as shown in FIG. 6. The brakes shown in dotted lines may be suitably positioned about the axles 28 and 29. The brakes may be operated in a conventional manner. The axles extend from side to side of the wheel assembly and furnish supports for wheels 30. Each wheel carries a tire 5. At each end of each spring is an axle-engaging part 32. An upper member 33 fits over the outer end portion of the spring and is secured to the member 32 by U-bolts 34. Within the upper spring-engaging member may be mounted a shock-absorbing part 35 which is of rubber or equivalent material. Preferably the member 32 is provided with an upwardly extending portion 36 which fits into a corresponding opening or perforation in the lowermost lamination of the spring 26. The spring-engaging members 32 may, if desired, be additionally secured to the axles 28 and 29 by welding. Where that is done the U-bolts are primarily effective to hold the upper spring-engaging members 33 in proper position.

In FIG. 7 an adjustment for the rollers 8 is shown. So far as possible the same members which appear on the corresponding parts in FIG. 2, for example, have been retained in FIG. 7. Wear on the tires and minor variation in tire sizes may require adjustment of the rolls 8 in order that they should come into contact with the tire at the proper moment. One means for making such adjustment is shown in FIG. 7. The shafts 9 are carried in adjusting plates 37. These support the shafts 9 in the same manner as do the plates 10 and 11 of the form of FIG. 2. Each of the plates 37 is provided with slots 38 and plates or frame members 39 are provided. Screws or bolts 40 engage the plates or frame members 39 and pass through the slots 38. They may be tightened to hold the plates 37 in vertical adjustment in the desired position. While the plates 37 may be adjusted up and down by hand, it is convenient to apply a mechanical means for doing this. In the form shown in FIG. 7 each of the plates 37 may be provided with a lateral extension 41 through which an adjusting screw 42 passes. The adjusting screw bears, at one end, upon the flange of the vehicle frame member 1 and by the adjustment of the screw 42 the plates 37 may be brought to the desired position of adjustment. When in that position they are fastened against further movement by the screws or bolts 40.

Although an operative form of the device has been shown, the invention is not limited to the particular details shown. Many changes may be made in the form, shape and arrangement of parts without departing from the spirit of the invention.

The use and operation of the invention are as follows:

In the form shown the device operates as follows: Except during tipping, the rollers or wheels or contacting members 8 are out of contact with the wheels 5. They overlie them as shown in FIG. 1 but ample clearance is provided between the wheels 5 and rollers 8 so that while the trailer is standing or moving over a road or other surface, the wheels 5 and the rollers 8 are out of contact. It is conceivable that the most extreme bump or jolt might cause instantaneous contact, although this is extremely unlikely. Should it occur, it would not alter the fact that for normal conditions of operation the rollers and wheels are completely out of contact with each other.

When a dump is to take place, the telescopic piston and cylinder assembly is expanded. By pressure fluid furnished through the connection 17 or a comparable connection from a pump or other source of pressure fluid the telescopic cylinder assembly expands from the inactive or unexpanded position of FIG. 1, in which the body 1 is completely untipped, to the final position of FIG. 5 in which the body is completely tipped. This tipping movement occurs because as the piston and the cylinder assembly expands under the influence of pressure fluid, the draft means 18 causes the trailer and tractor to move toward each other. One or the other may move, or both may move. As this movement occurs the ground-contacting members 5 and 6 of the trailer are tilted and the forward member is moved out of contact with the ground while the trailer rotates in the tipping direction about the rearmost wheels 5 and 6.

After a rather limited amount of tip, which is illustrated in FIG. 4, the body is moved from the completely untipped position of FIG. 1. By the time it has reached the position of FIG. 4, the rollers 8 are in contact with the wheels 5 and this contact is maintained as the body moves to the full tipped position of FIG. 5. Thus the tipping movement of the body of this invention is characterized by the fact that during all but the initial tipping movement the body is balanced and stabilized by the contact of the rollers 8 with the wheels 5 and thus the body, as it moves to and is maintained in its tipped position, is supported upon a base which is substantially wider than the base upon which it is supported when untipped and greater stability is thus produced during tipping than would otherwise be possible if the stabilizing members of this invention were omitted.

In the modified form of FIG. 6 a similar result is accomplished. As the body 22 is tipped with relation to the frame 20, the rollers 25 are brought into contact with the wheels 21. This contact is accomplished early in the tipping movement and is maintained during tipping and is broken only when the body has largely been returned to its untipped position.

It is recognized that many different sorts of ground-contacting means and trailer-supporting means are available and the invention is not limited to the presence or use of any particular one. As shown in the first five figures, the trailer is supported upon four pairs of wheels. As shown in the form of FIG. 6, the tractor is supported on a single pair of wheels. Obviously the trailer may be supported on one pair, two pairs or more. Similary, the truck of FIG. 6 might be supported on one pair of wheels, or two or more. Furthermore, endless treads or chains might be used and are currently used for supporting trailers and tractors.

This invention may be embodied in a trailer or tractor having any form of support. It is not limited to the ones shown. Whatever the type of support or ground-contacting means, parts equivalent to or comparable to the rollers 8 are provided and they are so arranged that after a predetermined amount of tip the rollers contact the wheels, treads, chains or other means present. As a result of this contact the width of the base of support is appreciably extended and greater stability of the tipped load-carrying body or platform is accomplished. In the form of the first five figures the rollers move about an arc which has its center at the center of the axle with respect to which the rearmost wheels 5 are mounted for rotation.

Since generally the vehicle frame is supported on the axle of the running gear, the width of the frame itself will generally determine the effective width of the support for the load-carrying member. This, even though it is relatively narrow, will generally be adequate properly to stabilize the body when it is untipped. When tipping occurs, particularly with large bodies, sufficient stability is lacking where the effective base is limited by the width of the frame of the vehicle involved. The longer the body that is tipped, the greater is the need for stability. Hence, the structure of this invention has the important advantage that it increases the effective width of the truck or trailer in relation to the points of support of the tipped body. By bringing the rollers or roller bearings 8 in contact with the outermost wheels 5, or the generally outer points of any other road-contacting members, this invention accomplishes the prompt and automatic extension of the effective supporting width of the tipped body in one commercial installation in which the trailer is supported upon four pairs of wheels as shown. The result is to extend the dimension of the effective width from approximately 35 inches about the centers of the springs to approximately 85 inches at the center of the outer tires 5. Thus the effective supporting width of the trailer is more than doubled and the stability of the tipped load-carrying member is immensely increased. This desirable result is accomplished with a minimum of additional parts which act automatically as a result of the tipping without the necessity of any particular manipulation or additional activity on the part of the operator.

I claim:

1. In combination, a tractor, a load-carrying trailer movably connected to the tractor, ground-contacting wheels supporting said load-carrying trailer including an axle, means connected to the trailer for tipping it about said wheels, that portion of the trailer closest to the tractor being moved upwardly during the tip, stabilizing means including rotary stabilizing members mounted on said load-carrying trailer and spaced above said wheels when said load-carrying trailer is in normal running position, said stabilizing members contacting said wheels after the beginning of the tip and thereafter rolling about and in contact with said wheels as the load-carrying trailer tips and the trailer, wheels and tractor move toward each other.

2. The combination of claim 1 further characterized in that after contact with said wheels said stabilizing members move in an arc which has its center concentric with an axle of said wheels.

3. The structure of claim 1 further characterized by and including means for vertically adjusting the position of said stabilizing members relative to the wheels.

References Cited in the file of this patent

UNITED STATES PATENTS

| | | |
|---|---|---|
| 714,239 | Rhodes | Nov. 25, 1902 |
| 1,255,038 | Olson | Jan. 29, 1918 |
| 1,425,821 | Anthony | Aug. 15, 1922 |
| 2,217,871 | Lindgren | Oct. 15, 1940 |
| 2,530,574 | Getman | Nov. 21, 1950 |
| 2,635,919 | Watson | Apr. 21, 1953 |
| 2,661,236 | Schonrock | Dec. 1, 1953 |
| 2,798,736 | Larkin | July 1, 1957 |
| 2,815,980 | Harbers et al. | Dec. 10, 1957 |
| 2,868,583 | Harbers et al. | Jan. 13, 1959 |